United States Patent
Milano, Jr.

(10) Patent No.: US 6,415,686 B1
(45) Date of Patent: Jul. 9, 2002

(54) POWER ASSEMBLY

(75) Inventor: Arthur J. Milano, Jr., Burlington, CT (US)

(73) Assignee: Seitz Corporation, Torrington, CT (US)

( * ) Notice: Subject to any disclaimer, the term of this patent is extended or adjusted under 35 U.S.C. 154(b) by 0 days.

(21) Appl. No.: 09/624,471

(22) Filed: Jul. 24, 2000

(51) Int. Cl.[7] ............................................. F16H 57/02
(52) U.S. Cl. ...................................... 74/606 R; 74/425
(58) Field of Search ........................... 74/395, 396, 425, 74/606 R; 73/162

(56) References Cited

U.S. PATENT DOCUMENTS

| | | | | |
|---|---|---|---|---|
| 2,388,863 A | * | 11/1945 | Noble | 74/425 |
| 3,874,247 A | * | 4/1975 | Durand et al. | 74/425.5 |
| 3,914,673 A | * | 10/1975 | Wallin | 318/325 |
| 5,085,106 A | * | 2/1992 | Bubnash | 74/866 |
| 5,836,076 A | * | 11/1998 | Duta et al. | 74/425 X |
| 6,029,763 A | * | 2/2000 | Swisher | 74/425 X |

\* cited by examiner

Primary Examiner—Robert Pezzuto
(74) Attorney, Agent, or Firm—Dallett Hoopes

(57) ABSTRACT

This power assembly has a housing with upper and lower housing portions and a frame of adjustable height in the housing. The housing mounts a worm gear in one of its portions, and the frame carries a worm on a fixed axis meshing with the worm gear. When the worm gear is changed for one of a different diameter, the frame carrying the worm may be raised or lowered to change the center distances so that the worm meshes with the new worm gear.

3 Claims, 5 Drawing Sheets

POWER ASSEMBLY

FIELD OF THE INVENTION

This invention relates to a power assembly, or "gear box", for supplying rotary power at a selected speed. More specifically, the assembly provides for the changing of a worm drive to alter the speed at which the assembly delivers. This is accomplished by changing the diameter of the worm gear and the distance between the driving worm and the axis of the worm gear.

BACKGROUND OF THE INVENTION

In the past worm-gear-type gearboxes have required a major restructuring to change the speed range. Basically, the restructuring has been in consequence of changing the diameter of the worm gear. Restructuring has involved a changing of the center distances between the worm gear and the worm and has usually involved the manufacture of a new housing, an expensive proposition. There has been a need for a simpler route which can be flexible and reversible, allowing changes to be readily made without major restructuring.

SUMMARY OF THE INVENTION

In the present invention the worm gear may be changed and the center distances changed without the need to manufacture a new housing. The invention is a power assembly comprising opposed aligned upper and lower housing portions, each being of open-box shape having a bottom wall and side walls to comprise a closed housing having spaced parallel top and bottom walls. One of said upper and lower housing portions rotatably mounts a worm gear having a fixed axis. A frame is disposed in the housing between and parallel to the top and bottom walls secured at a selected height relative to the worm gear, the frame mounting a worm on a fixed axis and meshing with the worm gear, and a motor on the frame operatively driving the worm.

With the structure thus described, it is possible to change the worm gear and move the frame carrying the worm closer or farther away from the worm gear axis so that the worm gear and the worm mesh properly.

DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
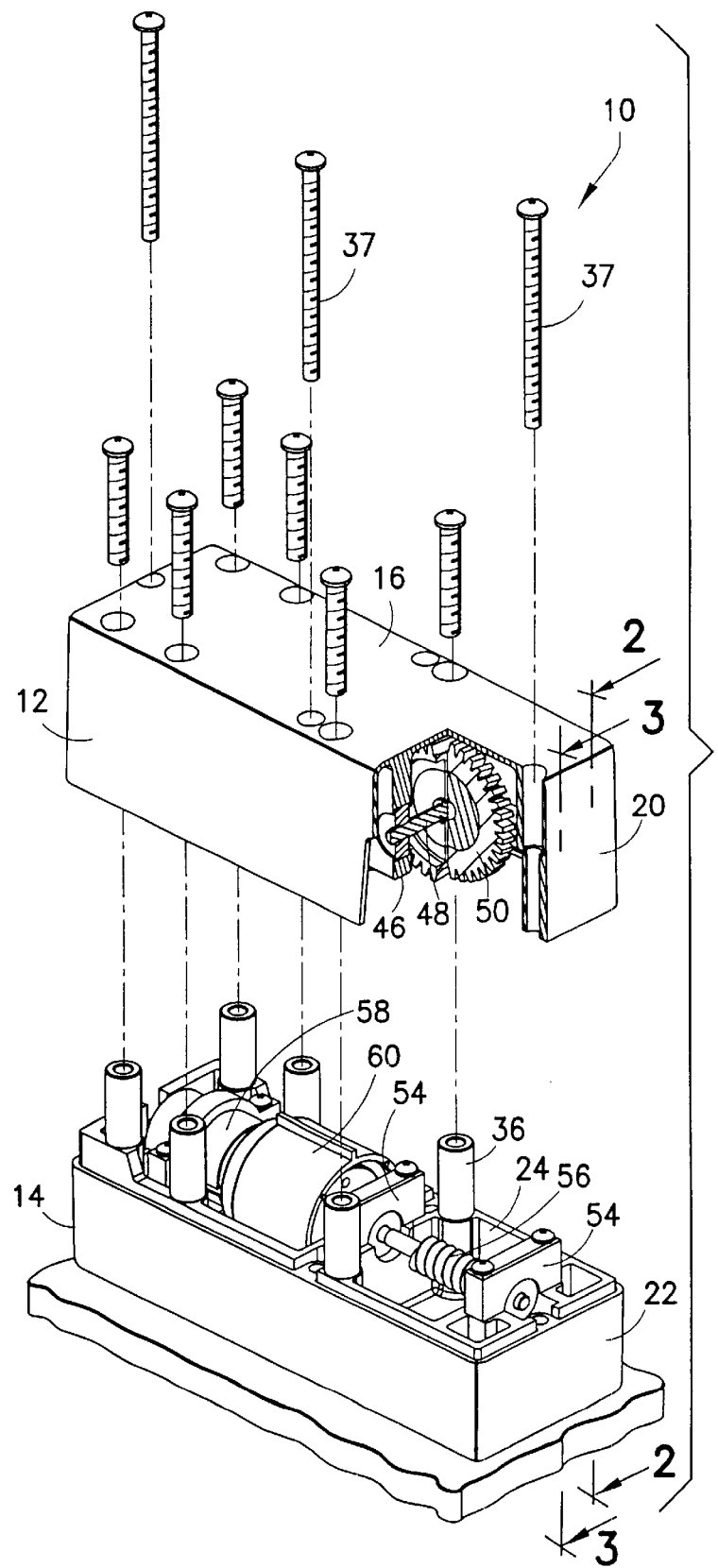
FIG. 1 is an exploded perspective view partly broken away of a power assembly embodying the invention.

A power assembly is generally designated 10 in FIG. 1 wherein it is shown in exploded perspective view. It comprises a housing including an upper housing portion 12 and a lower housing portion 14. Each housing portion is shaped as an open box defined by a top wall 16 and a bottom wall 18 (FIG. 2) respectively. The walls 16 and 18 have side walls 20 and 22 respectively, and the upper housing portion 12 and lower housing portions are aligned and opposed as shown and assembled (FIG. 2) into a closed housing wherein the top walls 16 and 18 are parallel and the side walls 20 and 22 meet. Within the housing is a frame 24 which is held at a selected height A or B, for instance, to be described below.

Recessed apertures 26 and 28 are formed in the upper housing portion and the lower housing portion respectively. Through the apertures 26, 28 extend headed threaded members 30 and 32 which are received into tapped vertical bores 34 in the frame 24. Spacers 36 of selected height receive the threaded members 30 and 32 intermediate the upper housing openings 26 and the frame 24 to space the frame down from the upper housing wall 16.

By virtue of the threaded fasteners 30, 32, the upper and lower housing portions are held together. Additionally, a plurality of longer threaded fasteners 37 extend through recessed openings in the upper housing portion into sleeves 38 and 40 in the upper housing portion and lower housing portion respectively and thus secure the upper and lower housing portions to a base plate 42 having a plurality of threaded holes 44.

Figure 5:
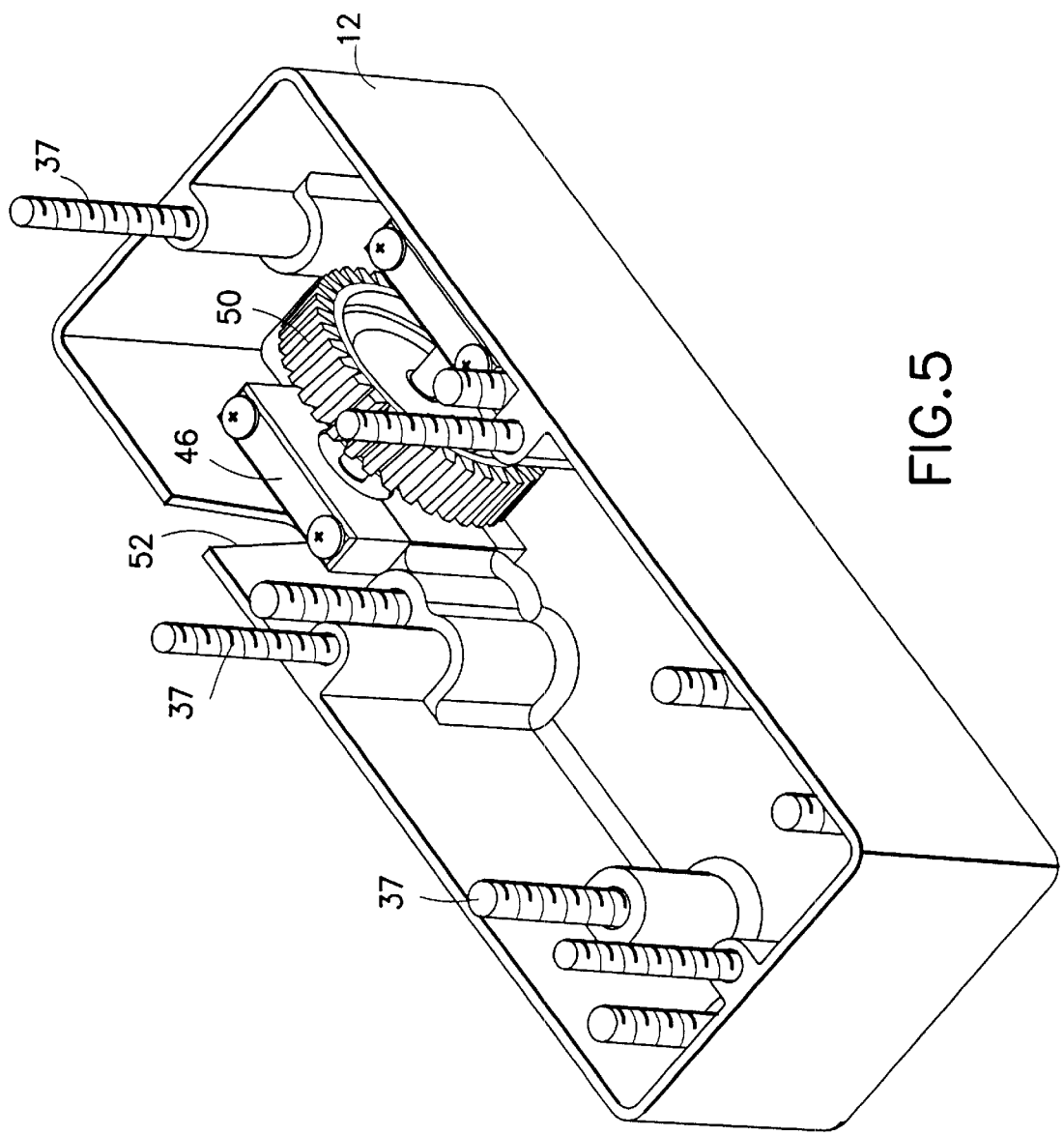
FIG. 5 is a perspective view of the upper housing inverted.

Mounted on the upper housing portion is a suitable pair of aligned bearings 46 which rotatably carry a shaft 48 mounting a worm gear 50. An end of the shaft 48 may be accessible through a notch 52 in the upper housing (FIG. 5) to provide a drive take-off.

Mounted on the frame is a pair of aligned bearing assembles 54 which mount the shaft 55 of a worm 56 on a fixed axis (FIG. 1). Operatively connected to the shaft of the worm 56 is a motor 58 having a reducer 60 which may include a suitable gear train. In assembly, with the upper and lower portions of the housing together as shown in FIG. 2, the worm gear 50 meshes with the worm 56 in an operative way so that the output of the motor is reduced and conveyed to the worm gear shaft 48.

Figure 2:
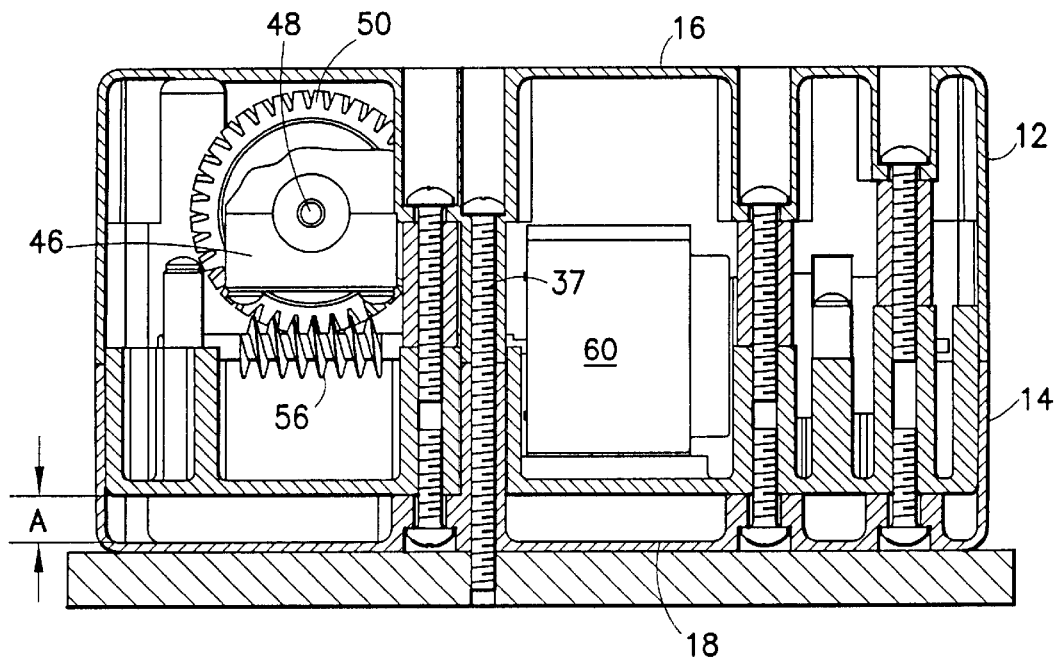
FIG. 2 is a sectional view taken on the line 2—2 of FIG. 1 in the unexploded condition with a worm gear bearing partly broken away.
Figure 2A:
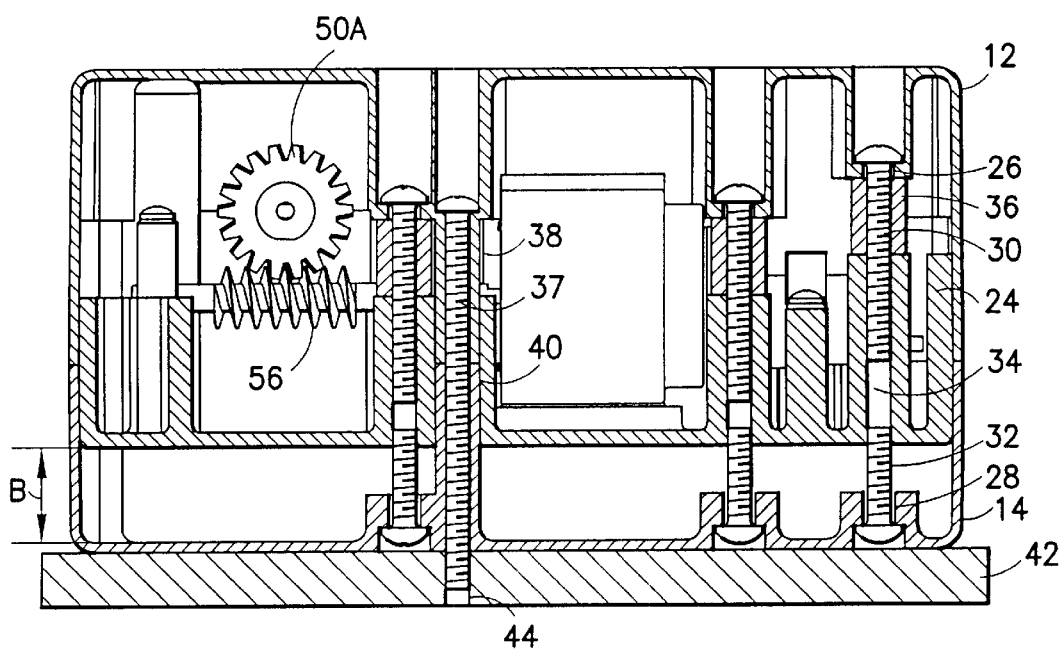
FIG. 2A is similar to FIG. 2 but showing the frame raised in the housing to accommodate a smaller worm gear.
Figure 3:
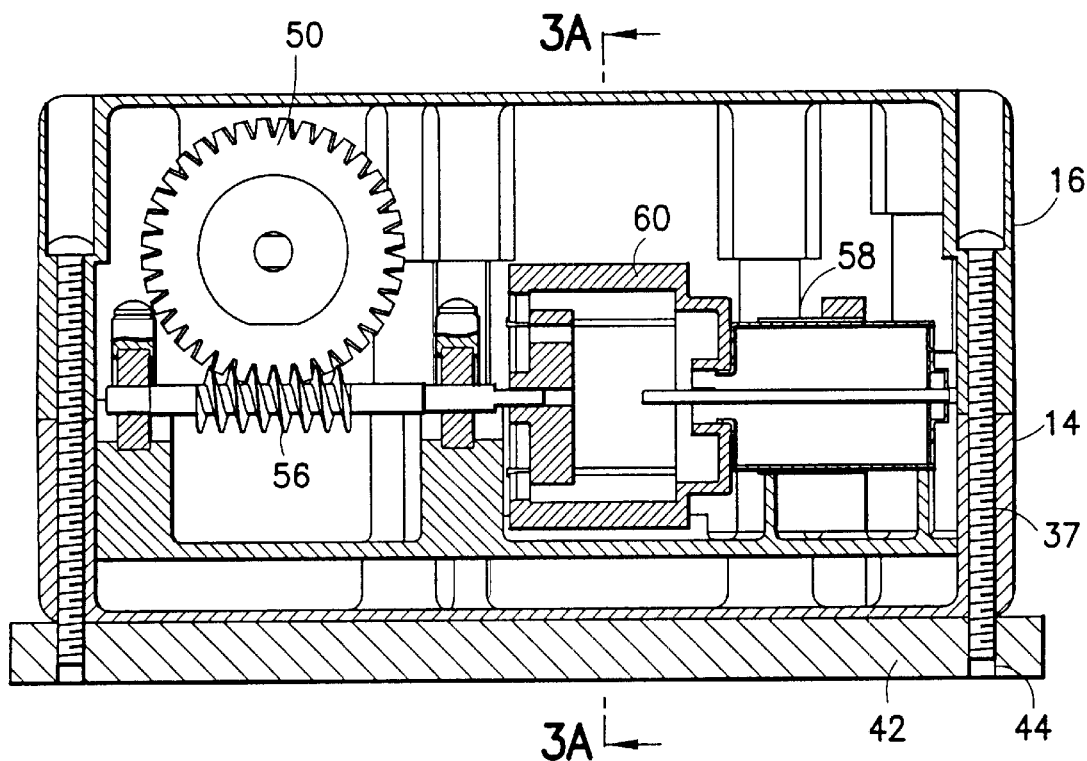
FIG. 3 is a sectional view taken on the line 3—3 of FIG. 1 in the unexploded condition.
Figure 3A:
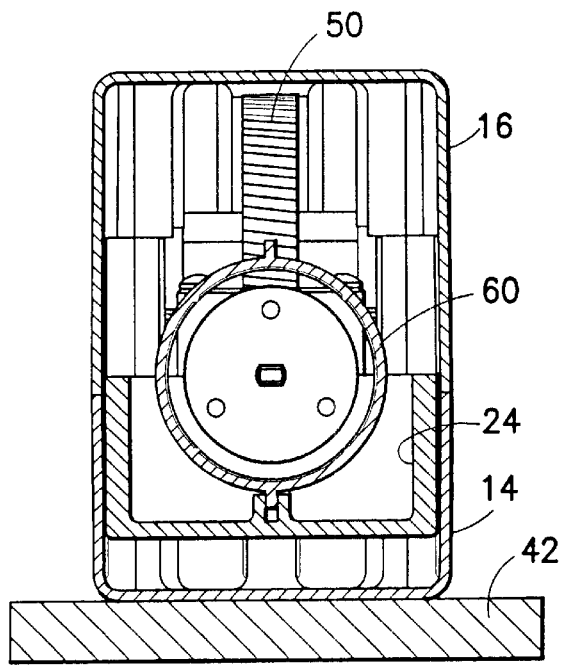
FIG. 3A is a sectional view taken on the line 3A—3A of FIG. 3.
Figure 4:
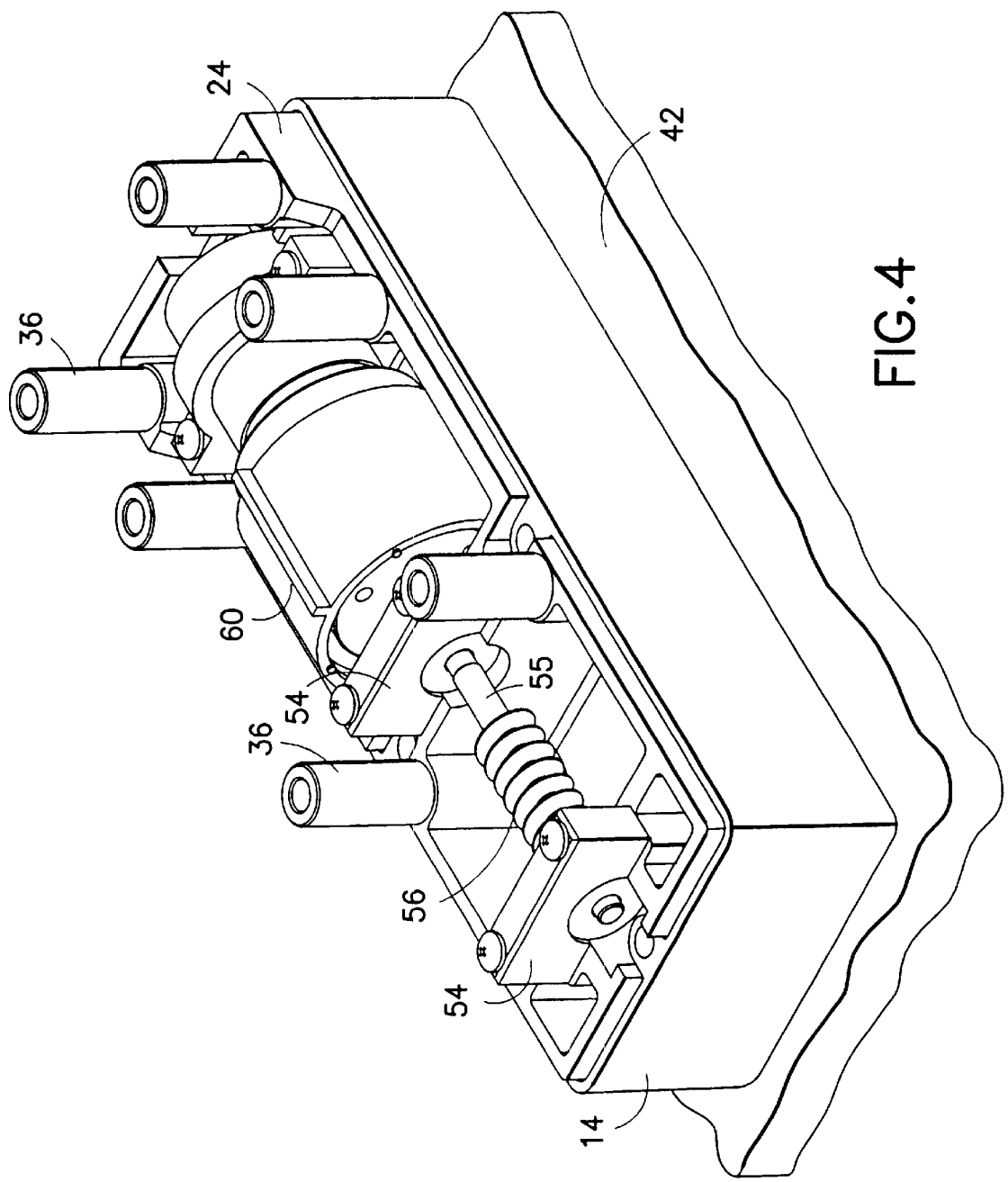
FIG. 4 is a perspective view showing the frame in the lower housing.

As demonstrated in FIGS. 2 and 2A, the consequence of the structure is that for different sizes the worm gears 50, 50a, spacers 36 may be selected to space the shaft 48 appropriately from the worm 56 so that there is proper meshing in the fully assembled unit. Thus, it is possible to achieve the desired output speed of shaft 38 without the need for entirely different housing. The correct spacing of the frame 24 from the worm gear 50, 50a is achieved by the length of the spacers 36. Note that with the larger gear 50, the frame 24 is only distance A above the bottom wall in FIG. 2. In contrast, with the smaller worm gear 50A, the frame 24 is distance B above the bottom wall in FIG. 2A.

It will be apparent to those skilled in the art that the spacers 36 above its frame instead of spacing the frame down from the top wall of the housing could be below the frame and space the frame up from the bottom wall.

Thus, variations the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A compact self-contained power assembly comprising opposed aligned upper and lower housing portions, each being of open box shape having a horizontal wall and side walls to comprise a closed rectangular housing having spaced parallel top and bottom walls, one of said upper and lower housing portions rotatably mounting worm gear in a vertical plane and having a fixed axis, a frame disposed in the housing between and parallel to the top and bottom walls and supported independent of the side walls of the housing, the frame mounting a worm on a fixed axis in the vertical plane with the worm gear, and a motor inside the housing and mounted on and surrounded by the frame and operatively driving the worm, a plurality of first vertically disposed threaded means extending between one of the horizontal walls and the frame, tubular spacers surrounding each first threaded means to space the frame from the horizontal wall to a selected height at which the worm meshes with the worm gear, the tubular spacers being selected from a group of tubular spacers of various lengths to complement the diameter of a selected worm gear from worm gears of different diameters.

2. A power assembly as claimed in claim 1 wherein second threaded means secures the upper and lower housing portions to each other.

3. A power assembly as claimed in claim 1 wherein the worm gear has a central shaft accessible from outside the housing.

\* \* \* \* \*